(12) United States Patent
Klimov et al.

(10) Patent No.: US 11,361,241 B2
(45) Date of Patent: Jun. 14, 2022

(54) OPTIMIZING QUBIT OPERATING FREQUENCIES

(71) Applicant: Google LLC, Mountain View, CA (US)

(72) Inventors: Paul Klimov, Santa Barbara, CA (US); Julian Shaw Kelly, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/971,512

(22) PCT Filed: Mar. 2, 2018

(86) PCT No.: PCT/US2018/020696
§ 371 (c)(1),
(2) Date: Aug. 20, 2020

(87) PCT Pub. No.: WO2019/168544
PCT Pub. Date: Sep. 6, 2019

(65) Prior Publication Data
US 2021/0334689 A1    Oct. 28, 2021

(51) Int. Cl.
*G06N 10/00*    (2022.01)

(52) U.S. Cl.
CPC .................................. *G06N 10/00* (2019.01)

(58) Field of Classification Search
None
See application file for complete search history.

(56) References Cited

U.S. PATENT DOCUMENTS

| | | |
|---|---|---|
| 2017/0230050 A1 | 8/2017 | Rigetti et al. |
| 2017/0357561 A1* | 12/2017 | Kelly ................. G06F 15/82 |
| 2019/0392344 A1* | 12/2019 | Kelly ................. G06N 10/00 |
| 2020/0057957 A1* | 2/2020 | Johnson ............. G06F 17/14 |
| 2020/0394524 A1* | 12/2020 | Vainsencher ...... G06N 3/084 |
| 2021/0035005 A1* | 2/2021 | Martinis ............. G06F 30/25 |
| 2021/0056455 A1* | 2/2021 | Shehab .............. G06F 9/4403 |
| 2021/0081816 A1* | 3/2021 | Klimov ............... G06N 5/04 |

(Continued)

FOREIGN PATENT DOCUMENTS

WO    WO 2017/078734    5/2017

OTHER PUBLICATIONS

Hutchings et al., "Tunable superconducting qubits with flux-independent coherence," Physical Review Applied, Oct. 2017, 8(4):044003, 17 pages.

(Continued)

*Primary Examiner* — Menatoallah Youssef
*Assistant Examiner* — Khareem E Almo
(74) *Attorney, Agent, or Firm* — Fish & Richardson P.C.

(57) ABSTRACT

Methods, systems, and apparatus for determining frequencies at which to operate interacting qubits arranged as a two dimensional grid in a quantum device. In one aspect, a method includes the actions of defining a first cost function that characterizes technical operating characteristics of the system. The cost function maps qubit operation frequency values to a cost corresponding to an operating state of the quantum device; applying one or more constraints to the defined first cost function to define an adjusted cost function; and adjusting qubit operation frequency values to vary the cost according to the adjusted cost function such that the operating state of the quantum device is improved.

19 Claims, 14 Drawing Sheets

(56) References Cited

U.S. PATENT DOCUMENTS

2021/0150404 A1\* 5/2021 Nakanishi ............. G06N 10/00
2021/0232961 A1\* 7/2021 Higa ...................... G06N 10/00

OTHER PUBLICATIONS

Kelly et al., "Fault-tolerant superconducting qubits," University of California, Santa Barbara, Mar. 2015, 207 pages.
Neill et al., "A blueprint for demonstrating quantum supremacy with superconducting qubits", Science, Apr. 2018, 360(6385):195-9, 22 pages.
Otterbach et al., "Unsupervised machine learning on a hybrid quantum computer," arXiv preprint arXiv1712.05771, Dec. 2017, 17 pages.
PCT International Preliminary Report on Patentability in International Appln. No. PCT/US2018/020696, dated Jul. 8, 2020, 10 pages.
PCT International Search Report and Written Opinion in International Appln. No. PCT/US2018/020696, dated Dec. 3, 2018, 19 pages.
Raussendorf et al., "Fault-tolerant quantum computation with high threshold in two dimensions," Physical review letters, May 2007, 98(19):190504, 4 pages.
CA Office Action in Canadian Application No. 3,092,781, dated Oct. 21, 2021, 3 pages.

\* cited by examiner

OPTIMIZING QUBIT OPERATING FREQUENCIES

CROSS-REFERENCE TO RELATED APPLICATION

This application is a National Stage Application under 35 U.S.C. § 371 and claims the benefit of International Application No. PCT/US2018/020696, filed Mar. 2, 2018. The disclosure of the foregoing application is hereby incorporated by reference in its entirety.

BACKGROUND

This specification relates to quantum computing.

Quantum computing devices use quantum-mechanical phenomena such as superposition and entanglement to perform operations on data. Quantum computing devices operate using two-level quantum mechanical systems called qubits.

SUMMARY

This specification describes methods and systems for determining operating frequencies for multiple qubits in the presence of hardware imperfections such as material defects.

In general, one innovative aspect of the subject matter described in this specification can be implemented in a method for determining frequencies at which to operate interacting qubits arranged as a two dimensional grid in a quantum device, the method including defining a first cost function that maps qubit operation frequency values to a cost corresponding to an operating state of the quantum device; applying one or more constraints to the defined first cost function to define an adjusted cost function; and adjusting qubit operation frequency values to vary the cost according to the adjusted cost function such that the operating state of the quantum device is improved.

Other implementations of this aspect include corresponding classical or quantum computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations adjusting qubit operation frequency values to vary the cost according to the adjusted cost function comprises: performing one or more multi-qubit optimization routines to obtain initial qubit operation frequency values; and performing one or more single qubit optimization routines to adjust the initial qubit operation frequency values to obtain final qubit operation frequency values.

In some implementations the one or more multi-qubit optimization routines may be performed in parallel.

In some implementations the one or more single qubit optimization routines may be performed in parallel.

In some implementations performing a multi-qubit optimization routine to obtain initial qubit operation frequency values comprises: performing a grid-scale optimization routine to obtain coarse-grained initial qubit operation frequency values; and performing a pair-scale optimization routine to adjust the coarse-grained initial qubit operation frequency values to fine-grained initial qubit operation frequency values.

In some implementations the operating frequencies comprise qubit idling frequencies and qubit interaction frequencies.

In some implementations the method further comprises identifying multiple idling frequency arrangements for the grid, comprising: defining an idling frequency splitting pattern for the grid; and bounding the range over which the splitting pattern can be slid in frequency without exceeding any qubit's accessible frequency range to determine a corresponding vector of operating frequencies for the qubits in the grid.

In some implementations identifying multiple idling frequency arrangements for the grid comprises assuming qubit relaxation time is constant.

In some implementations performing a grid-scale optimization routine to obtain coarse-grained initial qubit operation frequency values comprises evaluating the adjusted cost function for each identified idling frequency arrangement for the grid, comprising: setting the interaction frequency for each pair to approximately the mean value of the idling frequencies of the pairs constituent qubits; optimizing the adjusted cost function to determine coarse-grained initial qubit idling frequency values; and setting the mean idling frequency for each qubit pair as the coarse-grained initial two-qubit interaction frequency for that pair.

In some implementations performing a pair-scale optimization routine to adjust the coarse-grained initial qubit operation frequency values to fine-grained initial qubit operation frequency values comprises: fixing the coarse-grained initial qubit idling frequency values; determining fine-grained interaction qubit frequencies by varying the interaction frequency independently for each qubit pair to optimize the cost.

In some implementations the method further comprises bounding the range of interaction frequency values.

In some implementations performing a single qubit optimization routine to adjust the initial qubit operation frequency values to obtain final qubit operation frequency values comprises: determining final qubit idling frequency values by varying idling frequencies for each qubit independently to optimize the cost.

In some implementations the method further comprises bounding the range of idling frequency values.

In some implementations the method further comprises iteratively identifying multiple idling frequency arrangements for the grid until third termination criteria are met.

In some implementations the method further comprises repeatedly adjusting qubit operation frequency values to vary the cost according to the adjusted cost function such that the operating state of the quantum device is improved to account for qubit operation frequency time dependence.

In some implementations the cost function comprises a weighted sum of cost terms, the cost terms comprising one or more of: an idling cost term that penalizes i) low qubit relaxation time idling frequencies, and/or ii) low adjacent qubit detuning; and an interaction cost term that penalizes i) low qubit relaxation time interaction frequencies and/or ii) low qubit relaxation time frequency regions between qubit idling frequencies and a common interaction frequency.

In some implementations the one or more constraints incorporate knowledge of the physics and/or engineering constraints of the quantum computing device.

In some implementations the one or more constrains comprise one or more of predetermined differences in frequency between adjacent qubits, predetermined relationships between different types of operating frequencies, and/or predetermined acceptable frequency error tolerances.

The subject matter described in this specification can be implemented in particular ways so as to realize one or more of the following advantages.

A system implementing methods for determining respective frequencies at which to operate multiple qubits in a quantum computing device, as described in this specification, incorporates knowledge of the physics and/or engineering constraints of the quantum computing device into the methods in the form of optimization constraints. Such constraints reduce the complexity of the task of determining the respective operation frequencies. In addition, in some implementations determining the respective operation frequencies may require evaluation of a cost function a number of times that scales linearly with the number of qubits. The process of determining respective frequencies at which to operate multiple qubits may therefore require less computational resources and/or may be more computationally efficient to implement.

A quantum computing device that includes qubits that are operated at frequencies determined using the methods described in this specification may perform computations with fewer errors and increased accuracy compare to other systems that operate qubits at frequencies determined using other known methods.

The details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Quantum computing devices often include multiple qubits arranged in a two-dimensional grid, where neighboring qubits allowed to interact. Each qubit may be operated using respective operating frequencies, e.g., respective idling and interaction frequencies. The operating frequencies may vary from qubit to qubit, i.e., each qubit may idle at a different idling frequency. The operating frequencies may be chosen before a computation is performed by the quantum computing device.

Figure 1:
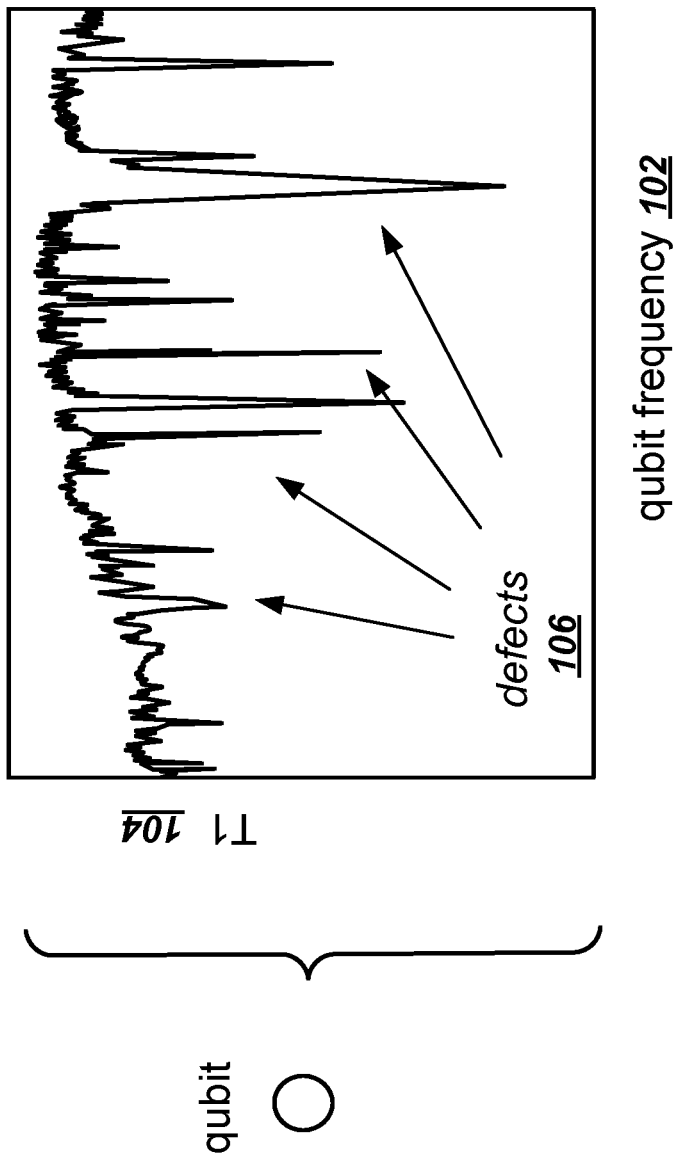
FIG. 1 depicts an example plot of qubit frequency versus qubit relaxation time.

Some operating frequencies are better than other operating frequencies. One proxy for assessing how good a particular operating frequency is for a particular qubit is that qubit's relaxation time (T1) at that frequency. Lower T1 times can lead to larger quantum computational errors, and so it is desirable to operate qubits at frequencies where T1 is high. A plot 100 illustrating an example relationship between qubit frequency 102 and T1 104 is shown in FIG. 1. Ideally, T1 varies smoothly and predictably as a function of qubit frequency. However, as shown in plot 100, in reality T1 varies sporadically and unpredictably in qubit frequency (and, although not shown in FIG. 1, in time and from qubit to qubit.) due to uncontrollable defects, as shown by the downward spikes 106.

Determining a set of operating frequencies that avoid defects is a high-dimensional and non-convex optimization problem that must be solved to operate a quantum computing device with low error rates. However, this optimization problem generally has a search space that scales exponentially with the number of qubits. Because of this, it can be intractable to solve for even small quantum processors.

This specification describes systems and methods for determining operating frequencies for qubits operating in the presence of defects. The methods use optimization constraints that incorporate knowledge of the physics and/or engineering constraints of the qubits/quantum computing device to reduce the complexity of the optimization problem. For example, in some cases the methods may exponentially reduce the size of the search-space. In addition, the methods may break the optimization problem into multiple independent sub-problems that may be solved quickly and in parallel using standard optimization techniques. The optimization problem may then proceed in the direction from grid-scale optimization, to pair-scale optimization, to qubit-scale optimization until final operating frequencies are determined.

Example Operating Environment

Figure 2:
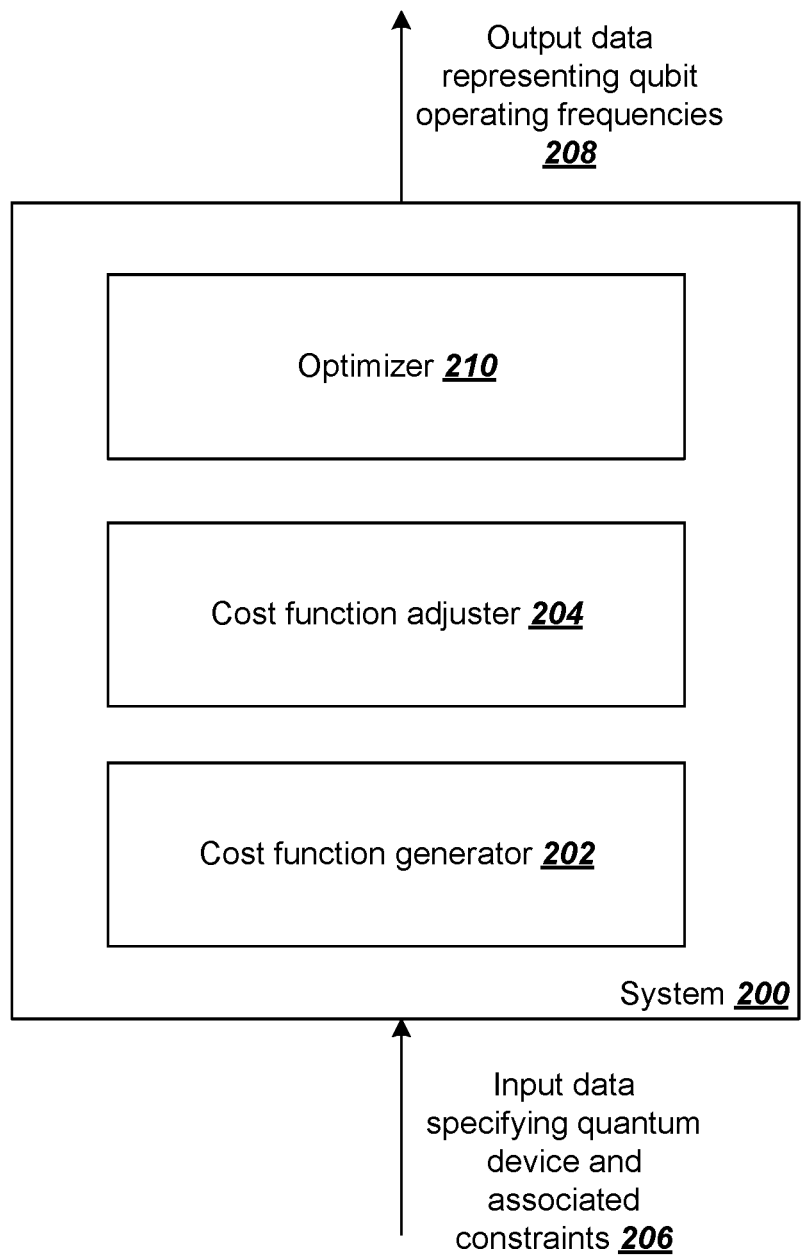
FIG. 2 depicts an example system for determining operating frequencies for multiple qubits.

FIG. 2 depicts an example system 200 for determining operating frequencies for multiple qubits. The example system 200 is an example of a system implemented as quantum or classical computer programs on one or more quantum or classical computers in one or more locations, in which the systems, components, and techniques described below can be implemented.

The system 200 receives as input data representing a quantum computing device that is to be used to perform computations, e.g., input data 206. For example, the input data 206 may include data representing properties of qubits included in the quantum computing device, such as the type of qubits included in the quantum computing device, the number of qubits included in the quantum computing device, the type of interactions between the qubits included in the quantum computing device, accessible frequency ranges of the qubits included in the quantum computing device, predicted and/or measured relaxation and/or coherence times of the qubits included in the quantum computing device.

The input data 206 may further include data representing optimization constraints that can be used to reduce the number of permissible qubit operating frequency configurations. Generally, the optimization constraints may be based on physics and engineering constraints of the quantum device (and its control system) and may vary. For example, optimization constraints may include predetermined constraints on differences in frequency between adjacent qubits, e.g., constraining qubit frequencies such that adjacent qubits idle X GHz apart from one another, predetermined constraints on relationships between different types of operating frequencies, e.g., constraining adjacent qubits to interact at the approximate mean of their idling frequencies, or predetermined constraints on acceptable frequency error tolerances.

The system 200 includes a cost function generator 202. The cost function generator 202 is configured to receive the input data 206 and define a first cost function that maps qubit operation frequency values to a cost corresponding to an operating state of the quantum device specified by the input data 206. The operating state of the quantum device may be defined as the set of qubit operation frequencies, e.g., idling and interaction frequencies, that are used by the quantum device during execution of a quantum algorithm. Defining such a cost function and example cost function terms are described in detail below with reference to FIG. 3.

The system includes a cost function adjuster 204. The cost function adjuster is configured to receive the input data representing one or more optimization constraints and apply the one or more constraints to the first cost function defined by the cost function generator 202 to define an adjusted cost function.

The system includes an optimizer module 210. The optimizer module 210 is configured to adjust qubit operation frequency values to vary a cost according to the adjusted cost function defined by the cost function adjuster 204 such that an operating state of the quantum device specified by the input data 206 is improved, e.g., computations performed by the quantum computing device using the adjusted qubit operation frequency values are less error-prone.

The optimizer module 210 may be configured to implement various standard optimization routines as part of adjusting qubit operation frequency values to vary a cost according to the adjusted cost function. Example optimization routines are described below with reference to FIGS. 3, 5-7.

The system 200 generates as output data representing qubit operating frequencies, e.g., output data 208. The generated output data 208 may be used to operate the qubits/quantum device that includes the qubits and perform computations.

Programming the Hardware

Figure 3:
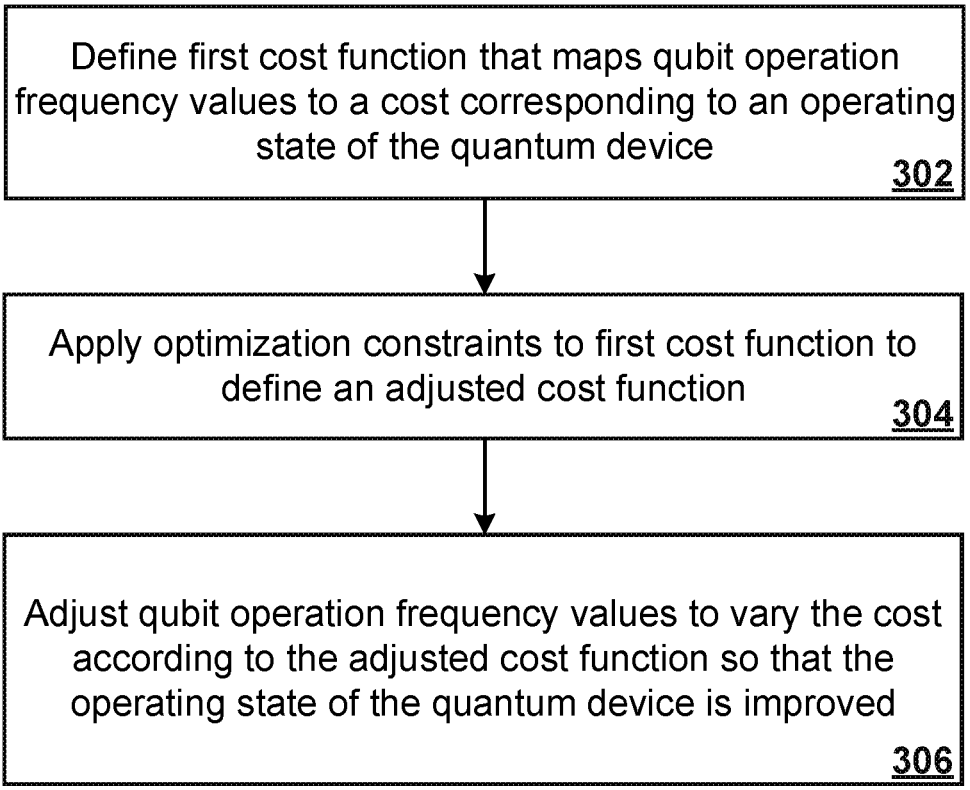
FIG. 3 is a flow diagram of an example process for determining frequencies at which to operate nearest-neighbor interacting qubits arranged as a two dimensional grid in a quantum computing device.

FIG. 3 is a flow diagram of an example process 300 for determining frequencies at which to operate nearest-neighbor interacting qubits arranged as a two dimensional grid in a quantum computing device. For convenience, the process 300 will be described as being performed by a system of one or more classical or quantum computing devices located in one or more locations. For example, the system 200 of FIG. 2 appropriately programmed in accordance with this specification can perform the process 300.

The type of operating frequencies determined by the system is dependent on the type of quantum computing device. For example, in some implementations, e.g., those where the quantum computing device includes a two dimensional grid of interacting superconducting qubits, the qubit operation frequencies may include idling frequencies and interaction frequencies. An idling frequency is a frequency at which a qubit is operated at when it is not involved in a computation or when it is being used to perform single qubit gates. A corresponding idling qubit frequency may be specified for each qubit in the quantum computing device. An interaction frequency is a common frequency at which adjacent qubits in the two dimensional grid is operated at when performing two-qubit gates. A corresponding interaction frequency may be specified for each pair of adjacent qubits.

For convenience, the process 300 is described for determining idling and interaction frequencies at which to operating nearest-neighbor interacting qubits in a superconducting quantum computing device, however the techniques described below may equally be applied for determining operation frequencies for any qubit architectures (e.g., quantum dots, defect spins, atoms) that comprise a network of interacting qubits (e.g., not limited to nearest neighbor interactions).

The system defines a first cost function that maps qubit operation frequency values (e.g., all qubit idling frequencies, as described below) to a cost (e.g., a real number) corresponding to an operating state of the quantum device (step 302). For example, a lower cost may correspond to a better operating state for the quantum device, e.g., an operating state that executes an arbitrary quantum algorithm with lower error rates compared to other operating states. In some cases a better operating state may depend on the quantum algorithm that the system is preparing for. The system may account for such dependencies by weighing individual cost function terms differently in the different optimization routines described below.

The first cost function includes a weighted sum of cost terms corresponding to respective costs. The type of cost terms included in the first cost function may vary and are dependent on the type of quantum computing device. Example cost function terms are described below.

Example Cost Function Terms

The first cost function may include an idling cost term that penalizes undesirable properties of qubit idling frequencies. For example, the idling cost term may penalize low qubit relaxation time (T1) idling frequencies. A plot 800 showing two example qubit idling frequencies is described below with reference to FIG. 8.

A single qubit idling cost $C_{idle}$ may be given by $$C_{idle}(f_{idle}^{qubit}) = T_{1,qubit}^{-1}(f_{idle}^{qubit})$$

where $f_{idle}^{qubit}$ represents the single qubit's idling frequency and $T_{1,qubit}^{-1}$ represent the inverse of the single qubit's relaxation time. For a grid of qubits, the above single qubit idling cost may be summed over all qubits in the grid $$C_{idle}^{grid}(\vec{f_{idle}}) = \sum_{qubit} C_{idle}(f_{idle}^{qubit})$$

where $\vec{f_{idle}} = (f_{idle}^{q00}, f_{idle}^{q01}, \ldots, f_{idle}^{qNM})$ represents a vector of idling frequencies for all qubits in the N by M grid.

Alternatively or in addition, the idling cost term may penalize low adjacent detuning between each adjacent pair of qubits (since low detuning amongst adjacent pairs of qubits can lead to unintentional interactions that can cause computational errors.) An illustration of unintentional detuning between different idling qubit frequencies for two qubits is described below with reference to FIG. 9.

A two-qubit detuning cost may be given by $$C_{det}^{q00-q01}(f_{idle}^{q00}, f_{idle}^{q01}) = (f_{idle}^{q00} - f_{idle}^{q01})^{-1}$$

For a grid of qubits, the above two—qubit detuning cost may be summed over all qubit—pairs in the grid $$C_{det}^{grid}(\vec{f_{idle}}, \vec{f_{int}}) = \sum_{pairs} C_{det}^{pair}(f_{idle}^{pair[0]}, f_{idle}^{pair[1]})$$

where pair represents a generic qubit pair and pair[0] and pair [1] represent qubits in that pair.

To perform a two-qubit computational gate, the participating qubits are brought into resonance. This requires the sweeping of both qubits' operating frequencies from their respective idling frequencies towards their common interaction frequency. The first cost function may include an interaction cost term that penalizes undesirable properties of interaction frequencies. For example, the first cost function may penalize low qubit relaxation time interaction frequencies.

Alternatively or in addition, the interaction cost term may penalize low qubit relaxation time frequency regions between qubit idling frequencies and a common interaction frequency, i.e., each qubit should be swept past as few defects as possible when approaching the common interaction frequency. An illustration showing an example sweeping of two qubit's operating frequencies from their respective idling frequency towards a common interaction frequency is described below with reference to FIG. 10. A comparison of two example sweepings of two qubit's operating frequencies from their respective idling frequency towards a common interaction frequency is described below with reference to FIG. 11.

The interaction cost term depends on an average T1 a qubit has during its frequency sweep from idling frequency to interaction frequency, weighted by the amount of time spent at each frequency. For example, for a qubit pair q00-q01, the interaction costs may include $$C_{int}^{q00}(f_{idle}^{q00}, f_{int}^{q00-q01}) = 1 - \exp\left(-\int_{t_{start}}^{t_{end}} T_{1,q00}^{-1}(t) dt\right) =$$

$$1 - \exp\left(-\int_{f_{idle}^{q00}}^{f_{int}^{q00-q01}} T_{1,q00}^{-1}(f_{q00}(t)) \frac{dt}{df_{q00}(t)} df\right)$$

$$C_{int}^{q01}(f_{idle}^{q01}, f_{int}^{q00-q01}) = 1 - \exp\left(-\int_{t_{start}}^{t_{end}} T_{1,q01}^{-1}(t) dt\right) =$$

$$1 - \exp\left(-\int_{f_{idle}^{q01}}^{f_{int}^{q00-q01}} T_{1,q01}^{-1}(f_{q00}(t)) \frac{dt}{df_{q01}(t)} df\right)$$

$$C_{int}^{q00-q01}(f_{idle}^{q00}, f_{idle}^{q01}, f_{int}^{q00-q01}) = C_{int}^{q00}(f_{idle}^{q00}, f_{int}^{q00-q01}) + C_{int}^{q01}(f_{idle}^{q01}, f_{int}^{q00-q01})$$

where $t_{start}$ and $t_{end}$ represent start and end times of the frequency trajectory $f_{qXY}(t)$ which starts and ends at $f_{idle}^{qXY}$, $f_{int}^{pair}$, respectively. $T_{1,qXY}^{-1}(t)$ represents relaxation time during the frequency sweep qXY, which depends on $f_{qXY}(t)$. Here it is assumed that the interaction frequency $f_{int}^{q00-q01}$ the same for q00 and q01, although in some implementations this may not be the case.

For the full qubit grid the interaction cost term is summed over all pairs in the grid $$C_{int}^{grid}(\vec{f_{idle}}, \vec{f_{int}}) = \sum_{pairs} C_{int}^{pair}(f_{idle}^{pair[0]}, f_{idle}^{pair[1]}, f_{int}^{pair})$$

where pair represents a generic qubit pair and pair[0] and pair[1] represents qubits in that pair.

The first cost function may be given by a weighted sum of the individual cost terms, e.g., the idling cost term and the interaction cost term described above. The weights may be design parameters that take any value between 0 and 1 and may be chosen based on an importance of the associated cost. For example, the first cost function may be given by $$C_{total}^{grid}(\vec{f_{idle}}, \vec{f_{int}}) = w_{idle} \sum_{qubit} C_{idle}(f_{idle}^{qubit}) + w_{det} \sum_{pairs} C_{det}^{pair}(f_{idle}^{pair[0]}, f_{idle}^{pair[1]}) + \ldots + w_{int} \sum_{pairs} C_{int}^{pair}(f_{idle}^{pair[0]}, f_{idle}^{pair[1]}, f_{int}^{pair})$$

The formal solution to the first cost function may be given by $$\underset{\vec{f_{idle}}, \vec{f_{int}}}{\mathrm{argmin}}(C_{total}^{grid}(\vec{f_{idle}}, \vec{f_{int}})).$$

In general, this this problem has high dimension and is non-convex. To demonstrate the complexity: if there were only 2 possible frequency configurations for each qubit, the number of possible frequency configurations would be equal to the size of the Hilbert space of the quantum processor. In realistic situations, there are far more configurations and so evaluating the cost function for all possible configurations is not tractable.

The system applies one or more optimization constraints to the defined first cost function to define an adjusted cost function (step 304). Example optimization constraints are described above with reference to FIG. 2.

The system adjusts qubit operation frequency values to vary the cost according to the adjusted cost function such that the operating state of the quantum device is improved (step 306). Adjusting the qubit operation frequency values to vary the cost according to the adjusted cost function such that the operating state of the quantum device is improved is a simpler task than adjusting the qubit operation frequency values to vary the cost according to the first cost function such that the operating state of the quantum device is improved due to the application of the one or more optimization constraints described above with reference to step 304, since the one or more optimization constraints reduce the number of permissible operating frequency configurations and can break the task of adjusting the qubit operation frequency values into multiple independent sub-tasks that may be solved quickly and in parallel using standard optimization techniques, e.g., basin hopping.

To adjust the qubit operation frequency values to vary the cost according to the adjusted cost function, the system may perform one or more multi-qubit optimization routines to obtain initial qubit operation frequency values. As described in more detail below, performing a multi-qubit optimization routine may include performing a grid-scale optimization routine to obtain coarse-grained initial qubit operation frequency values and performing a pair-scale optimization routine to adjust the coarse-grained initial qubit operation frequency values to fine-grained initial qubit operation frequency values. The system may then perform one or more single qubit optimization routines to adjust the initial qubit operation frequency values to obtain final qubit operation frequency values.

In some implementations the one or more multi-qubit optimization routines and the one or more single qubit optimization routines may be performed in parallel.

performed by a system of one or more classical or quantum computing devices located in one or more locations. For example, the system 200 of FIG. 2 appropriately programmed in accordance with this specification can perform the process 400.

The system defines an idling frequency splitting pattern for the grid (step 402). As described below, the idling frequency splitting pattern may be represented by a vector of frequency deviations $\vec{df}$ that is dependent on the one or more physics and engineering constraints of the quantum device described above with reference to step 304 of FIG. 3. For example, the one or more constraints may include a constraint that specifies that neighboring qubits idle at respective frequencies that are at least 1 GHz from one another. This constraint may be used to define the idling frequency splitting pattern.

The system bounds the range over which the splitting pattern can be slid in frequency without exceeding any qubit's accessible frequency range to determine a corresponding vector of operating frequencies for the qubits in the grid (step 404). During the preparation step, it may be assumed that qubit relaxation time T1 is constant.

The process 400 may be described as follows:

---

1. Input:

a) a vector of frequency deviations $\vec{df} = (df^{q00}, df^{q01}, \ldots, df^{qNM})$ with $\vec{f_{idle}} = \vec{f_0} + \vec{df}$, where $\vec{f_0}$ represents a vector of center frequencies, the vector having arbitrary length with spacing between points given by $f_{0,\,step}$. The vector of frequency deviations $\vec{df}$ represents the splitting pattern for the grid, and can be used to define physics and engineering constraints of the quantum device (and control system).

b) a vector containing minimum accessible frequency values for each qubit, i.e., values representing dynamic range minimums, $\vec{f_{min}} = (f_{min}^{q00}, f_{min}^{q01}, \ldots, f_{min}^{qNM})$. The minimum accessible frequency values are fixed and determined by the quantum device hardware and fabrication parameters.

c) a vector containing maximum accessible frequency values for each qubit, i.e., values representing dynamic range maximums, $\vec{f_{max}} = (f_{max}^{q00}, f_{max}^{q01}, \ldots, f_{max}^{qNM})$. The maximum accessible frequency values are fixed and determined by the quantum device hardware and fabrication parameters.

d) $f_{0,\,step}$

2. Algorithm:

a) Compute bounds $f_{0,\,min}$, $f_{0,\,max}$ such that each $f_{idle}^{qubit} \in \vec{f_{idle}} = \vec{f_0} + \vec{df}$ does not exceed its qubit's dynamic range defined by $f_{min}^{qubit}$, $f_{max}^{qubit}$.

i. $f_{0,\,min} = f_0$ such that $\min[(f_0 + \vec{df}) - \vec{f_{min}}] = 0$
    ii. $f_{0,\,max} = f_0$ such that $\min[\vec{f_{max}} - (f_0 + \vec{df})] = 0$ 3. Output:

a) $\vec{f_0} = (f_{0,\,min}, f_{0,\,min} + f_{0,\,step}, \ldots, f_{0,\,max} - f_{0,\,step}, f_{0,\,max})$

---

In some implementations the T1 spectrum for each qubit can vary in time. This gives the first cost function an additional time dependence. To account for this time dependence, the system may repeatedly adjust qubit operation frequency values to vary the cost according to the adjusted cost function such that the operating state of the quantum device is improved. The characteristic timescales of the time dependence—which may be determined through physics experiments—determines how often the system should repeat the process 300.

Optimization Preparation

Figure 4A:
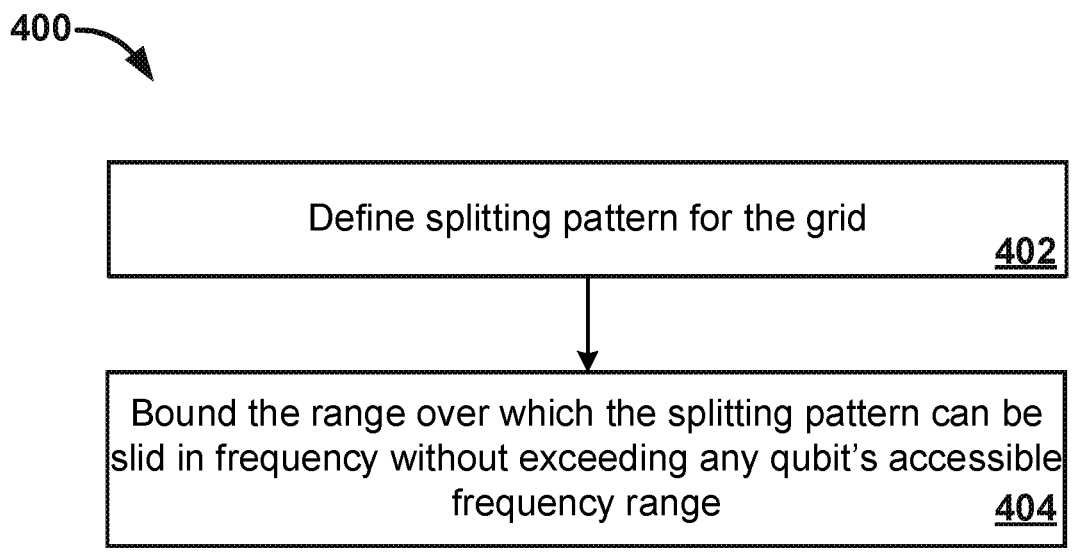
FIG. 4A is a flow diagram of an example process for identifying multiple idling frequency arrangements for a two dimensional grid of qubits.
Figure 4B:
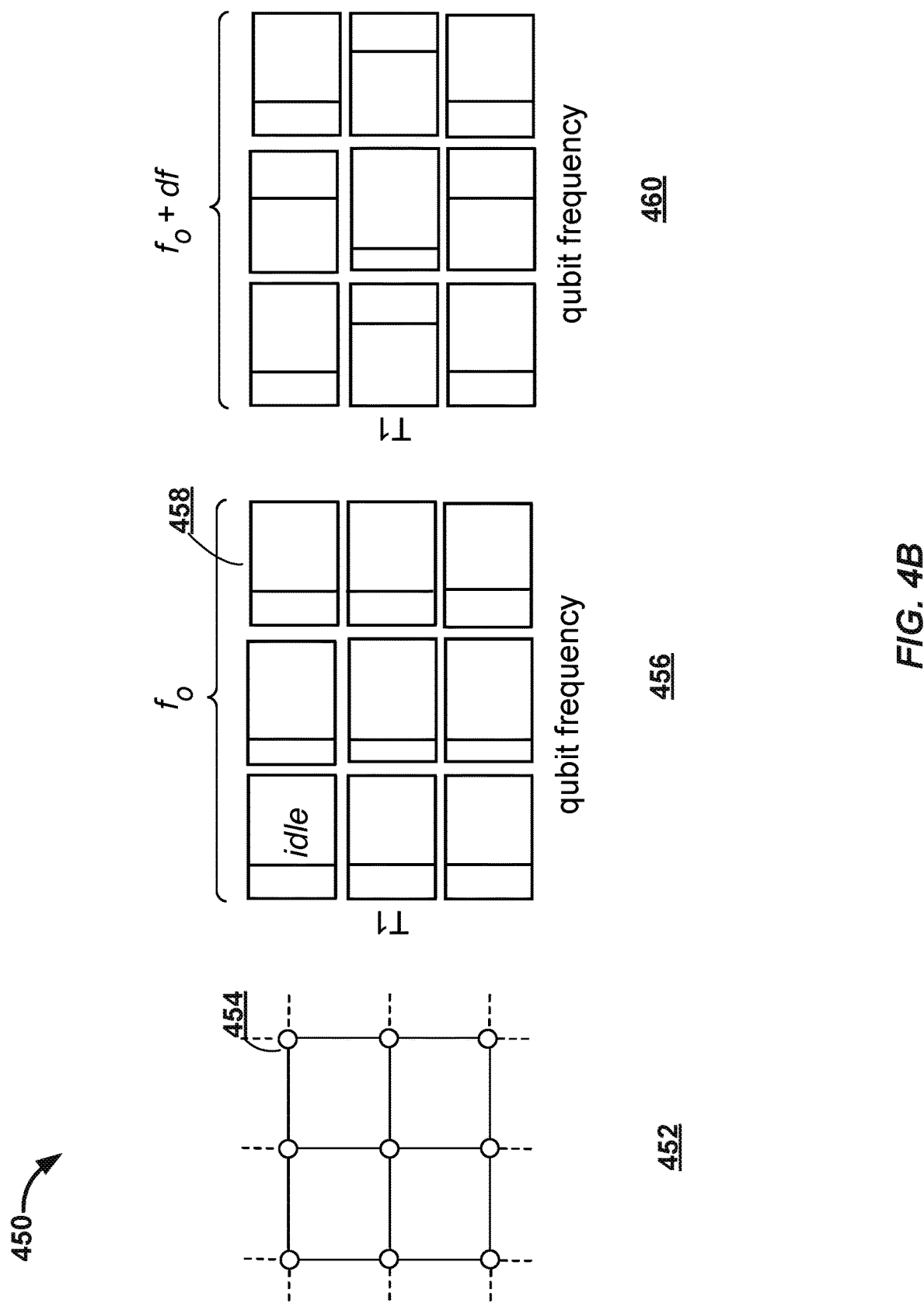
FIG. 4B is an illustration of an example splitting pattern for a two dimensional grid of qubits.

In some implementations adjusting the qubit operation frequency values to vary the cost according to the adjusted cost function may include a preparation step that includes identifying an idling frequency arrangement for the grid described above with reference to FIG. 3. FIG. 4A is a flow diagram of an example process 400 for identifying an idling frequency arrangement for a two dimensional grid of qubits. For convenience, the process 400 will be described as being FIG. 4B is an illustration 450 of an example splitting pattern for a two dimensional grid of qubits. The left panel 452 represents a two-dimensional grid of qubits, e.g., qubit 454, with nearest neighbor interactions. The central panel 456 illustrates an initial seeding of the idling frequencies for the qubits in the two-dimensional grid. Each box in the central panel plots qubit frequency versus T1 for a respective qubit. For example, box 458 plots qubit frequency versus T1 for qubit 454. As shown in the central panel 456, the idling frequencies of the qubits are initially set at a same value. The right panel 460 illustrates an example idling frequency pattern for the qubits in the two-dimensional grid. In the example idling frequency pattern, a detuning has been implemented simultaneously for all qubits in the two-dimensional grid through the addition of a vector of frequency deviations $\vec{df}$ as described above. As shown in the right panel 460, the qubit idling frequencies satisfy the example constraint that nearest neighbors need to be detuned. It is noted that this configuration of idling frequencies would be optimal in the case of no material defects and no stray couplings between qubits.

Grid-Scale Optimization

Figure 5A:
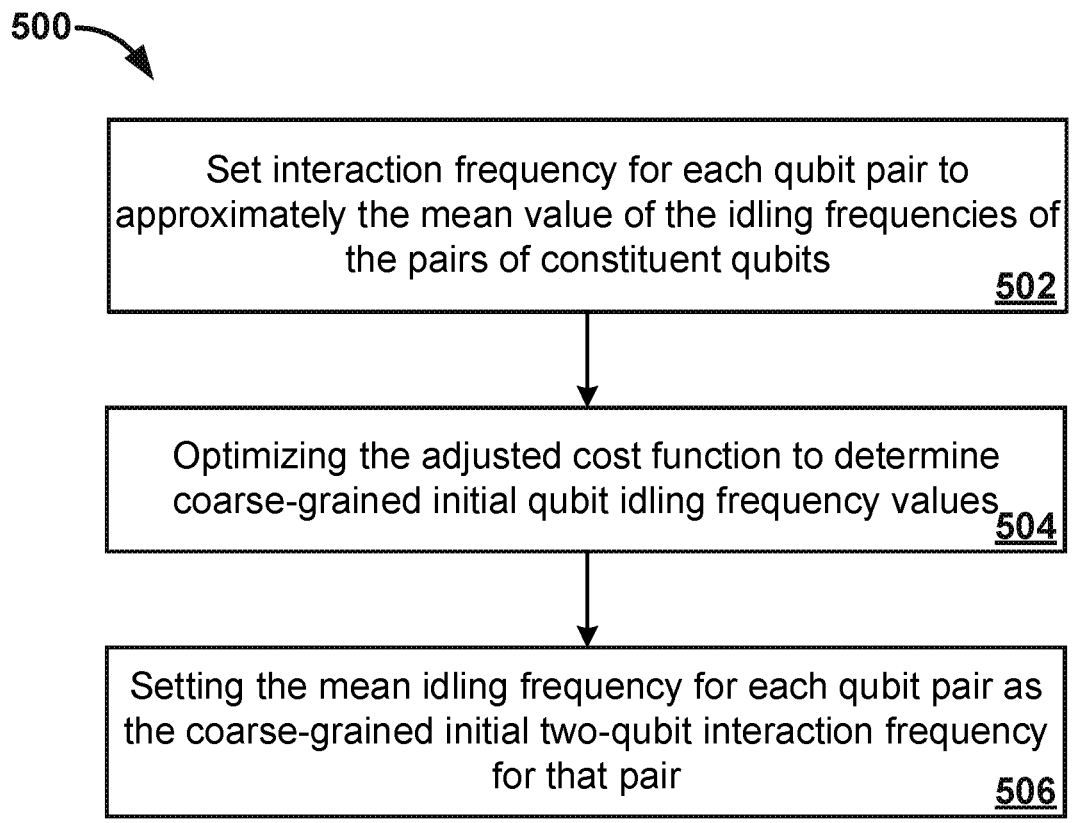
FIG. 5A is a flow diagram of an example process for performing a grid-scale optimization routine.

FIG. 5A is a flow diagram of an example process 500 performing a grid-scale optimization routine. For convenience, the process 500 will be described as being performed by a system of one or more classical or quantum computing devices located in one or more locations. For example, the system 200 of FIG. 2 appropriately programmed in accordance with this specification can perform the process 500.

The system evaluates the adjusted cost function (defined above with reference to FIG. 3) for each identified idling frequency arrangement for the grid (defined above with reference to FIG. 4A). This includes setting the interaction frequency for each qubit pair to approximately the mean value of the idling frequencies of the pairs constituent qubits (step 502), and optimizing the adjusted cost function to determine coarse-grained initial qubit idling frequency values (step 504). The system may further set the mean idling frequency for each qubit pair as the coarse-grained initial two-qubit interaction frequency for that pair (step 506).

The grid-scale optimization routine may be described as follows:

---

1. Input:
   a) $C_{total}(\vec{f_{idle}}, \vec{f_{int}}) = C_{int}^{grid}(\vec{f_{idle}}, \vec{f_{int}}) + C_{idle}^{grid}(\vec{f_{idle}}, \vec{f_{int}})$
   b) $\vec{f_0}$
   c) $\vec{df}$
2. Algorithm:
   a) For each $f_0 \in \vec{f_0}$:
      i) Set $\vec{f_{idle}} = f_0 + \vec{df}$
      ii) Set $f_{int}^{pair} = \text{mean}(f_{int}^{pair[0]}, f_{int}^{pair[1]})$ for each $f_{int}^{pair} \in \vec{f_{int}}$
      iii) Compute $C_{total}(\vec{f_{idle}}, \vec{f_{int}})$
   b) Find $\tilde{f}_0 = \arg\min_{f_0}(C_{total}(\vec{f_{idle}}, \vec{f_{int}}))$ using standard optimization techniques such as basin hopping.
3. Output:
   a) $\vec{f_{idle}}^{coarse} = \tilde{f}_0 + \vec{df}$
   b) $\vec{f_{int}}^{coarse}$ = coarse interaction frequencies at idling means

---

The number of cost function evaluations is $N \dim(\vec{f_0})$ where N represents the total number of qubits.

In some implementations the system may select several $\tilde{f}_0$ corresponding to different (and optimally distant) minima. All of these $\tilde{f}_0$ can then be explored via the below steps. The system may then select a frequency configuration corresponding to the lowest final cost minimum.

Figure 5B:
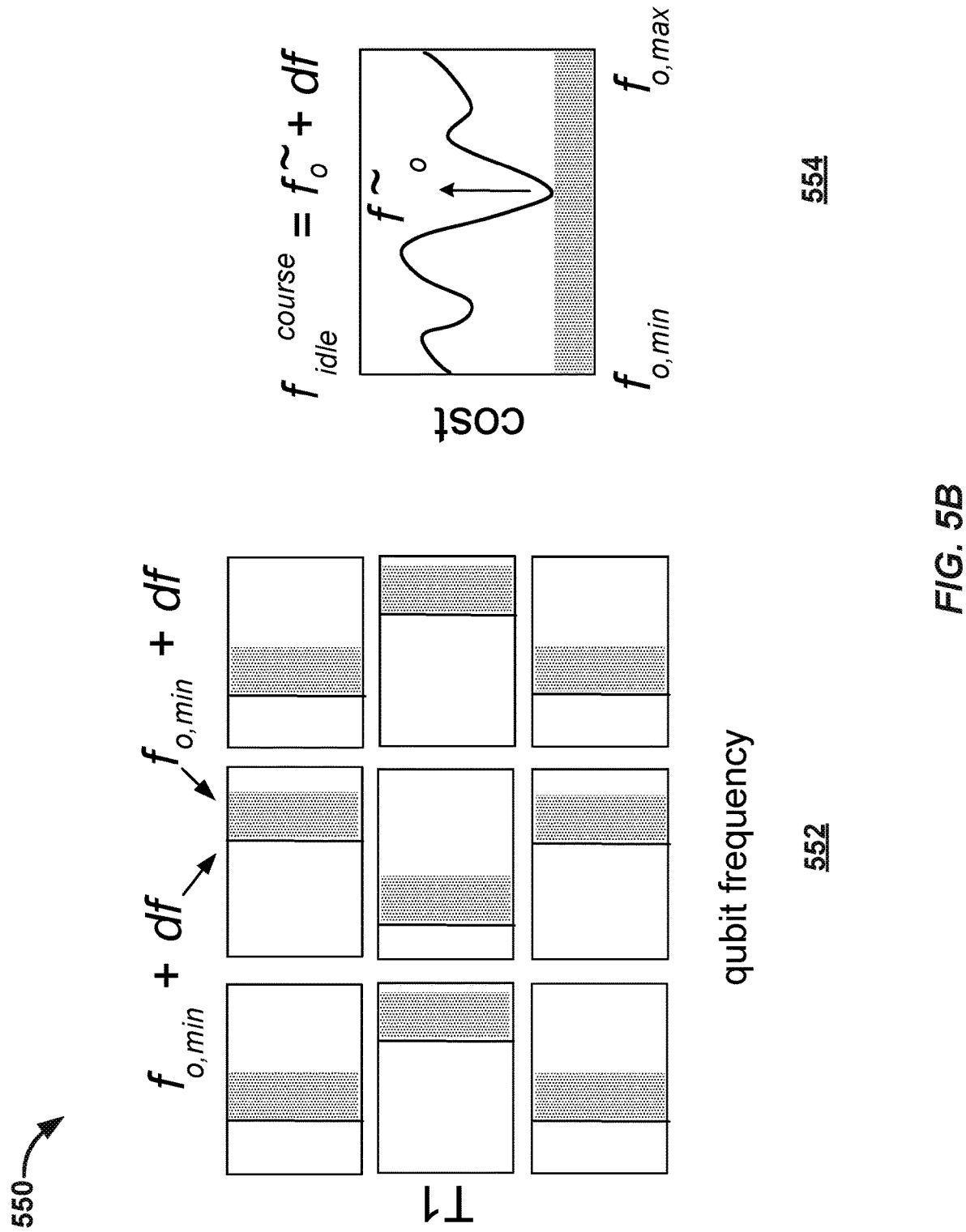
FIG. 5B is an illustration of an example grid-scale optimization routine.

FIG. 5B is an illustration 550 of an example grid-scale optimization routine. For convenience, the illustration 550 builds upon illustration 450 described above with reference to FIG. 4B. The left panel 552 illustrates a result of sweeping the frequencies illustrated in panel 460 described with reference to FIG. 4B over the T1 spectra of the qubits and evaluating the (adjusted) cost function at each step in the dynamic range of the qubits, e.g., using an optimizer, as shown in the right panel 554. This information is used to determine a frequency range over which to operate the qubit.

Pair-Scale Optimization

Figure 6A:
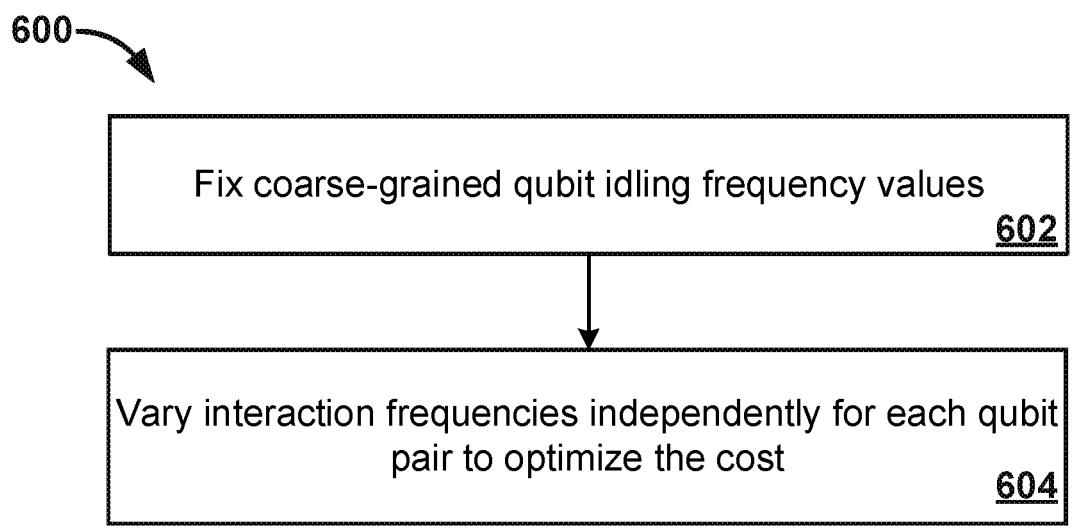
FIG. 6A is a flow diagram of an example process for performing a pair-scale optimization routine.

FIG. 6A is a flow diagram of an example process 600 performing a pair-scale optimization routine to adjust the coarse-grained initial qubit operation frequency values to fine-grained initial qubit operation frequency values. For convenience, the process 600 will be described as being performed by a system of one or more classical or quantum computing devices located in one or more locations. For example, the system 200 of FIG. 2 appropriately programmed in accordance with this specification can perform the process 600.

The system fixes the coarse-grained initial qubit idling frequency values (step 602) and determines fine-grained interaction qubit frequencies by varying the interaction frequency independently for each qubit pair to optimize the cost (step 604). In some implementations the system may bound the range of interaction frequency values to a predetermined frequency range such that the coarse grained idling frequencies determined during the grid-scale optimization step remain valid and such that the quantum device constrains remain satisfied.

The pair-scale optimization routine may be described as follows:

---

1. Input:
   a) $\vec{f_{idle}}^{coarse}$
   b) $\vec{f_{int}}^{coarse}$
   c) $C_{int}^{grid}(\vec{f_{idle}}, \vec{f_{int}})$
2. Algorithm:
   a) Fix $\vec{f_{idle}} = \vec{f_{idle}}^{coarse}$
   b) Initialize $\vec{f_{int}} = \vec{f_{int}}^{coarse}$
   c) Choose $\delta f_{int}$ representing an amount that the interaction frequencies are allowed to vary during the optimization steps
   d) Find $\arg\min_{f_{int}}(C_{int}^{grid}(\vec{f_{idle}}, \vec{f_{int}}))$ via standard optimization techniques.
      i) Let each $f_{int}^{pair} \in \vec{f_{int}}$ vary independently
      ii) Bound each $f_{int}^{pair} \in f_{int}^{pair, coarse} \pm \delta f_{int}$
3. Output:
   c) $\vec{f_{int}}^{fine} = \arg\min_{f_{int}}(C_{int}^{grid}(\vec{f_{idle}}, \vec{f_{int}}))$

---

The number of cost function evaluations is $(2(N_x \times N_y) - (N_x + N_y)) \times M_{int\ steps}$ where $N_x$ and $N_y$ represent the number of qubits along the two axes of the grid, and $M_{int\ steps}$ represents the total number of interaction frequencies to explore per pair.

Figure 6B:
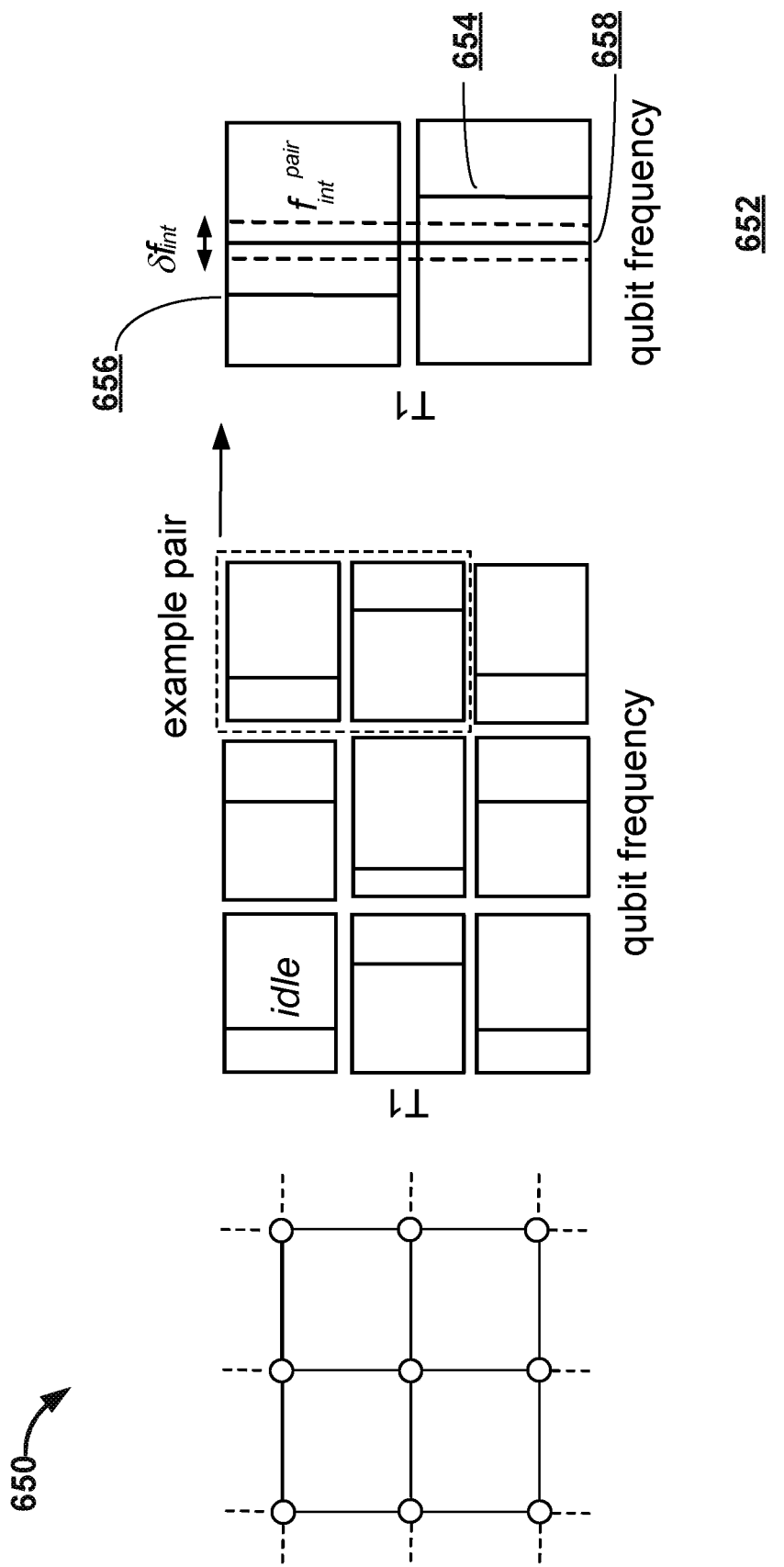
FIG. 6B is an illustration of an example pair-scale optimization routine.

FIG. 6B is an illustration 650 of an example pair-scale optimization routine for an example pair of qubits 652. For convenience, the illustration 650 builds upon illustrations 450, 550 described above with reference to FIGS. 4B and 5B. As shown in illustration 650, to perform the pair-scale optimization routine for the example pair of qubits 652 the idling frequencies 654 and 656 are fixed, and the interaction frequency 658 is moved from the midpoint between the idling frequencies 654 and 656 to determine an optimal interaction frequency.

Qubit-Scale Optimization

Figure 7A:
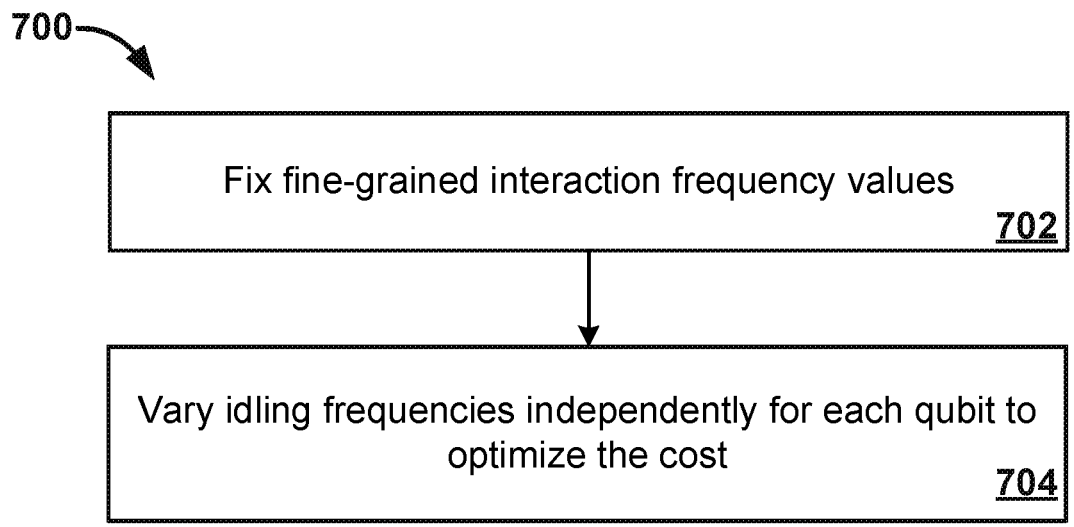
FIG. 7A is a flow diagram of an example process for performing a qubit-scale optimization routine.

FIG. 7A is a flow diagram of an example process 700 performing a single qubit optimization routine to adjust initial qubit operation frequency values to obtain final qubit operation frequency values. For convenience, the process 700 will be described as being performed by a system of one or more classical or quantum computing devices located in one or more locations. For example, the system 200 of FIG. 2 appropriately programmed in accordance with this specification can perform the process 700.

The system determines final qubit idling frequency values by fixing the fine-grained interaction qubit frequencies (step 702) and varies the idling frequencies for each qubit independently to optimize the cost (step 704). In some implementations the system may bound the range of idling frequency values to a predetermined frequency range such that fine grained interaction frequencies determined in the pair-scale optimization routine remain valid and such the quantum device constrains remain satisfied.

The qubit-scale optimization routine may be described as follows:

---

1. Input:
   a) $\vec{f}_{idle}^{coarse}$
   b) $C_{idle}^{grid}(\vec{f}_{idle})$
2. Algorithm:
   a) Initialize $\vec{f}_{idle} = \vec{f}_{idle}^{coarse}$
   b) Choose $\delta f_{idle}$ representing an amount that the idling frequencies are allowed to vary during the optimization steps c) Find $\underset{\vec{f}_{int}}{\mathrm{argmin}}\left(C_{idle}^{grid}(\vec{f}_{idle})\right)$ via standard optimization techniques.

iii) Let each $f_{idle}^{qubit} \in \vec{f}_{qubit}$ vary independently
   iv) Bound each $f_{idle}^{qubit} \in f_{idle}^{qubit, coarse} \pm \delta f_{idle}$
3. Output:

a) $\vec{f}_{int}^{fine} = \underset{\vec{f}_{idle}}{\mathrm{argmin}}\left(C_{idle}^{grid}(\vec{f}_{idle})\right)$

---

The number of cost function evaluations is $N \times M_{idle\ steps}$ where N represents the number of qubits and $M_{int\ steps}$ represents the total number of idling frequencies to explore per qubit. The total number of cost function evaluations (including the grid-scale optimization routine, pair-scale optimization routine and single qubit optimization routine) is therefore $N\ \dim(\vec{f}_0) + NM_{idle\ steps} + (2N-(N_x+N_y)) \times M_{int\ steps} \sim O(N)$.

Figure 7B:
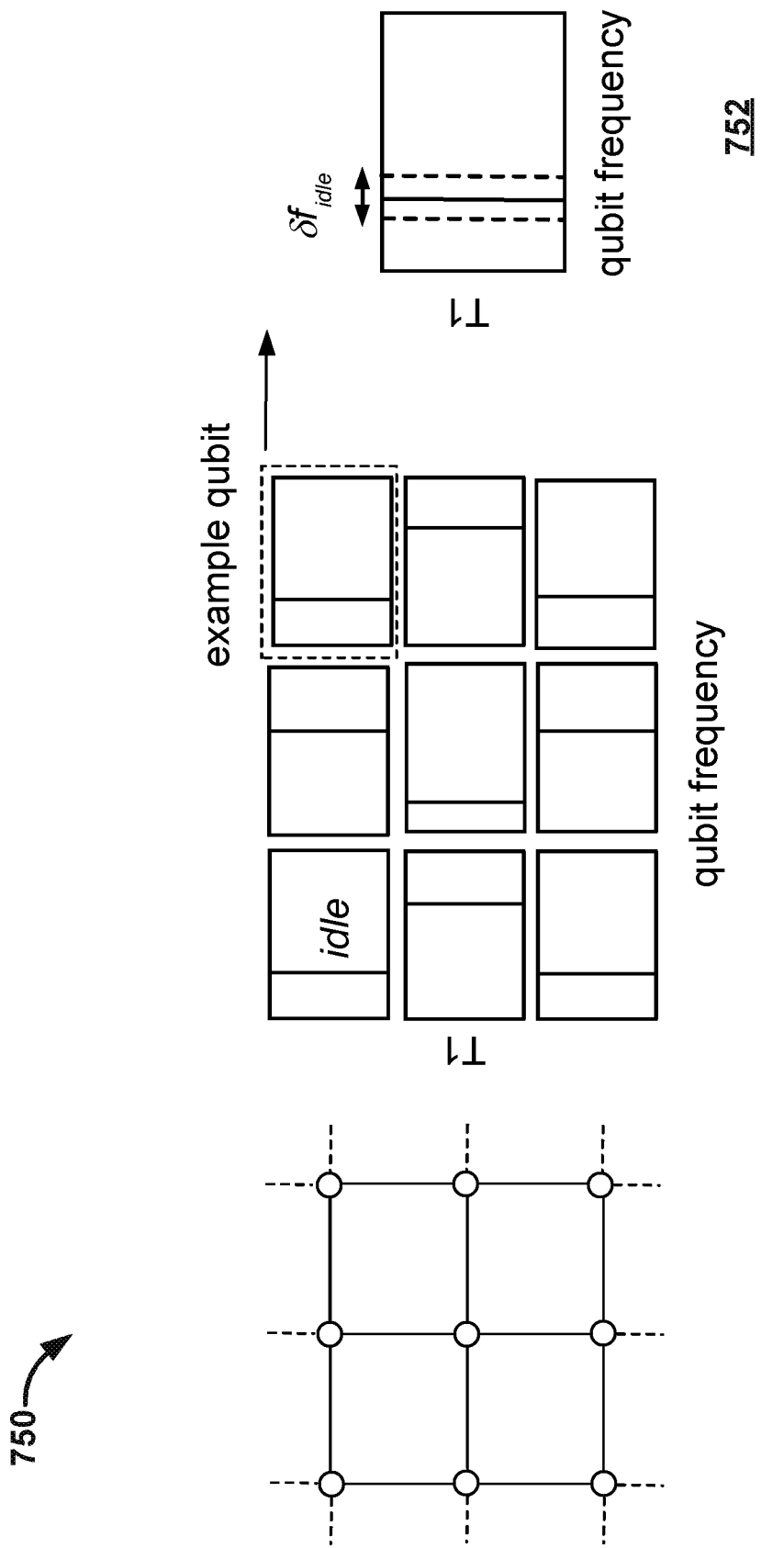
FIG. 7B is an illustration of an example qubit-scale optimization routine.

FIG. 7B is an illustration 750 of an example qubit-scale optimization routine for a qubit 752. For convenience, the illustration 750 builds upon illustrations 450, 550, 650 described above with reference to FIGS. 4B, 5B and 6B. As shown in illustration 750, to perform the qubit-scale optimization routine for the example qubit 753, the idling frequency is adjusted within a bound $\delta f_{idle}$ to determine an optimal idling frequency.

Example Operating Frequencies

Figure 8:
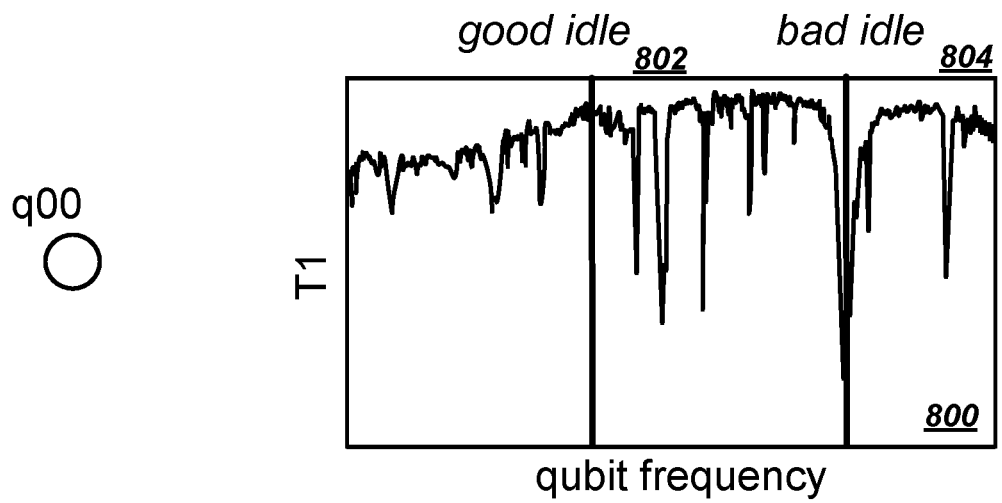
FIG. 8 is a plot showing two example qubit idling frequencies.

FIG. 8 is a plot 800 showing two example qubit idling frequencies. The plot 800 illustrates an example relationship between qubit frequency and qubit relaxation time T1 for qubit q00. The plot marks a first possible operating point 802 and a second operating point 804. The relaxation time T1 is higher at the first operating point 802 than the second operating point 804, which overlaps with a downward spike (a defect). The first operating point 802 therefore represents a better choice of qubit idling frequency than the second operating point 804.

Figure 9:
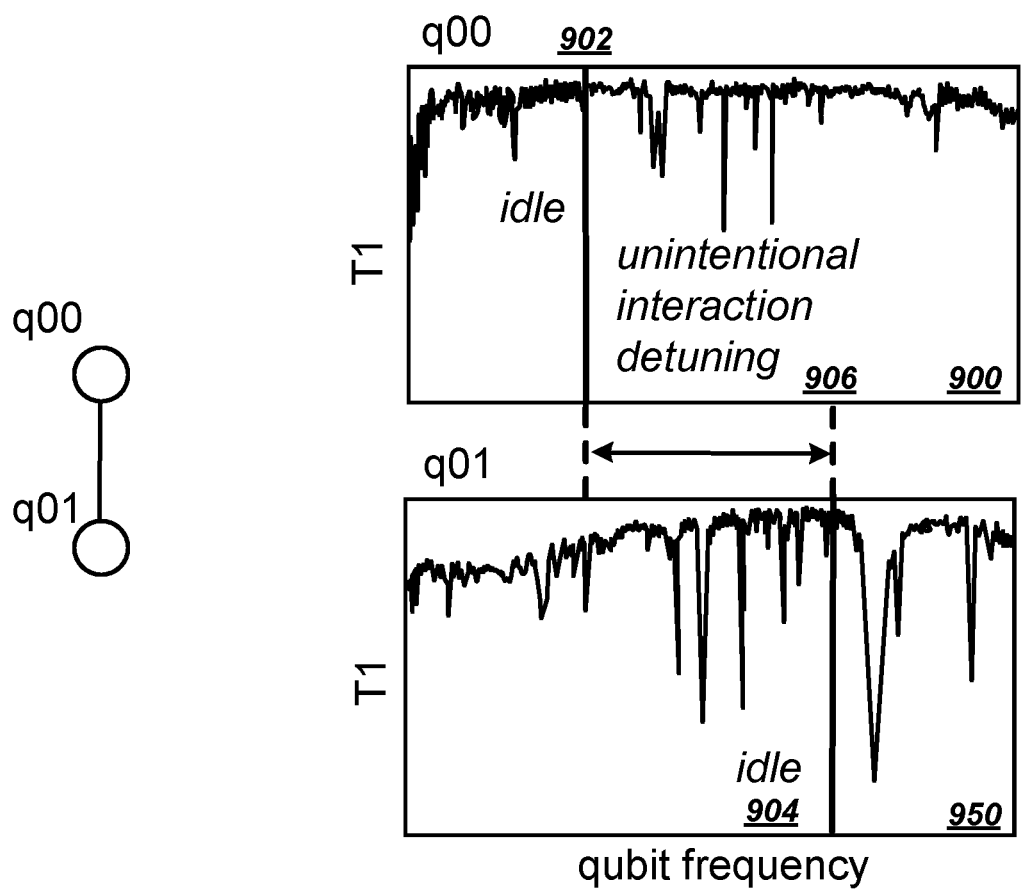
FIG. 9 illustrates an example unintentional detuning between different idling qubit frequencies for two qubits.

FIG. 9 illustrates an example unintentional detuning between different idling qubit frequencies for two qubits q00 and q01. Plot 900 illustrates an example relationship between qubit frequency and qubit relaxation time T1 for qubit q00. Plot 950 illustrates an example relationship between qubit frequency and qubit relaxation time T1 for qubit q01. Qubit q00 idles at an idling frequency 902 and qubit q01 idles at a different idling frequency 904. As shown in FIG. 9, if respective idling frequencies of neighboring qubits do not differ by a large enough amount (the amount being a design parameter that depends on the particular quantum device) the qubits may suffer from unintentional interaction detuning 906.

Figure 10:
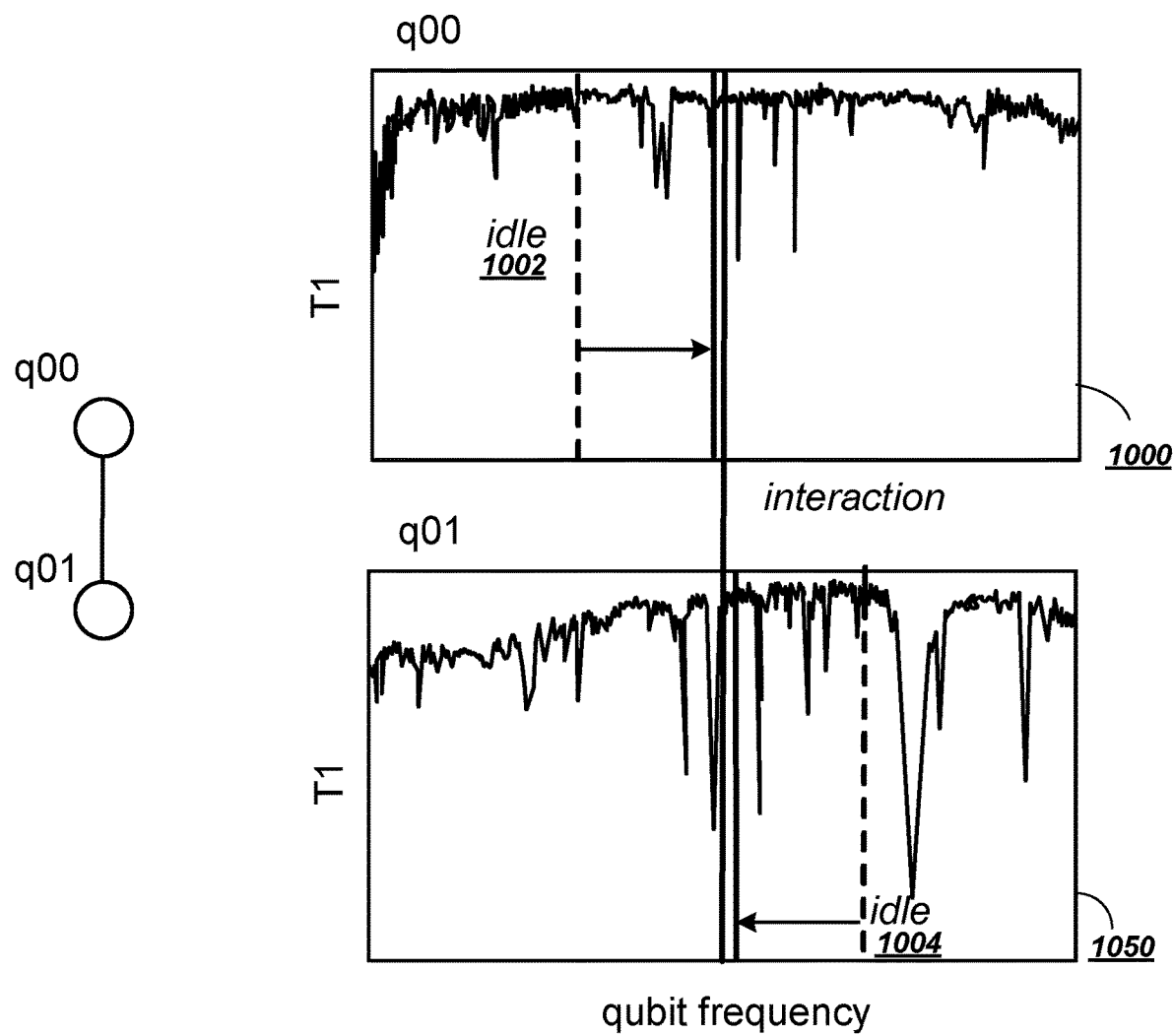
FIG. 10 is an illustration showing an example sweeping of two qubit's operating frequencies from their respective idling frequency towards a common interaction frequency.

FIG. 10 is an illustration showing an example sweeping of two qubit's operating frequencies from their respective idling frequency towards a common interaction frequency. Plot 1000 shows an example relationship between qubit frequency and qubit relaxation time T1 for qubit q00. Plot 1050 illustrates an example relationship between qubit frequency and qubit relaxation time T1 for qubit q01. Qubit q00 idles at an idling frequency 1002 and qubit q01 idles at a different idling frequency 1004. The frequency of qubits q00 and q01 are swept from their respective idling frequencies 1002 and 1004 towards a common interaction frequency 1006. The interaction frequency 1006 has been chosen such that it does not coincide with a qubit q00 or q01 defect, e.g., does not coincide with a downward spike, and lies in a region where the T1 metric is high.

Figure 11:
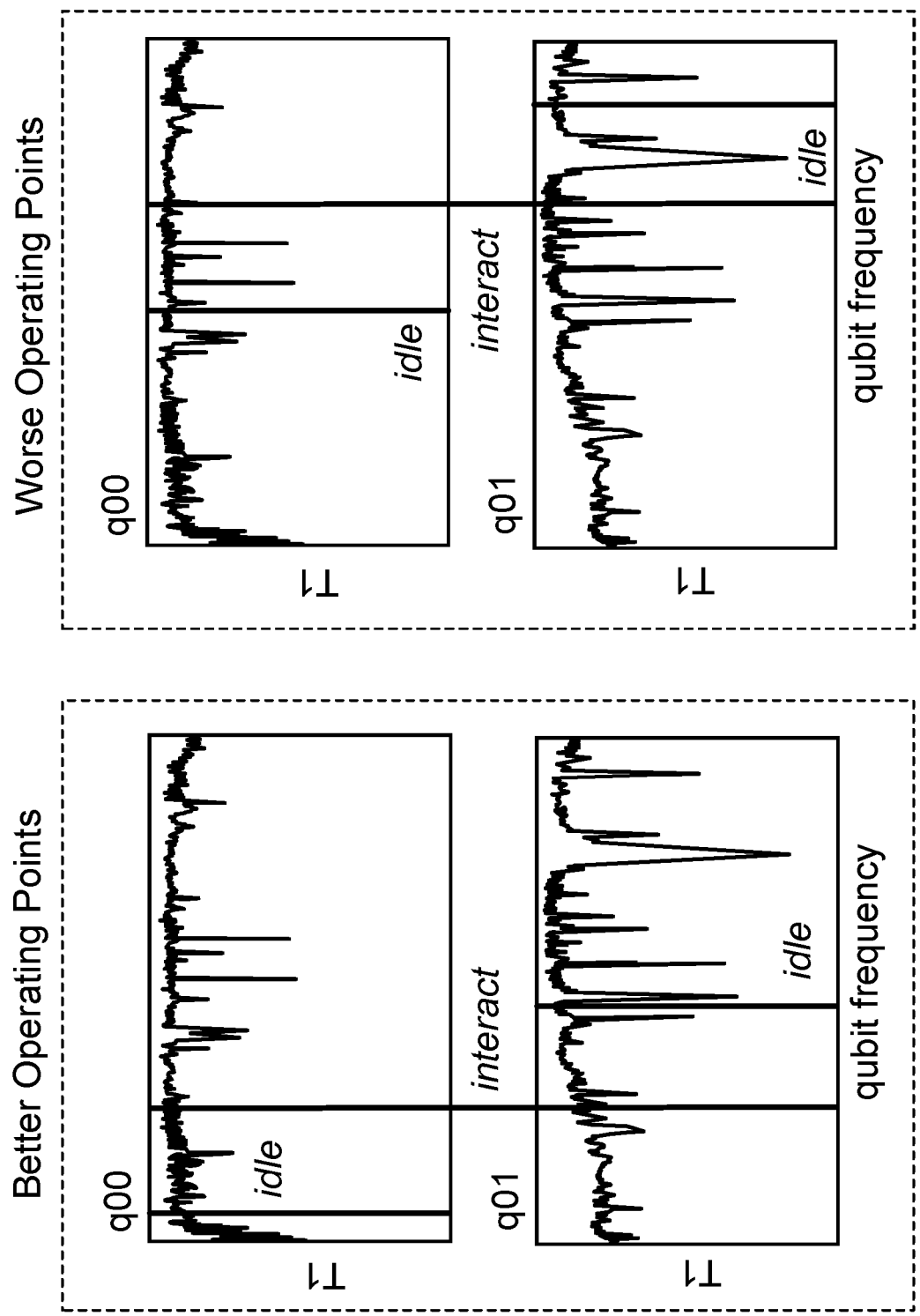
FIG. 11 compares two illustrations of example sweeps of two qubit's operating frequencies from their respective idling frequency towards a common interaction frequency.
Figure 11:
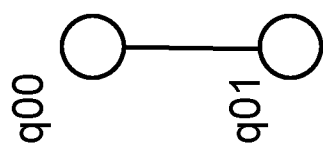

FIG. 11 shows two illustrations 1100 and 1150. Illustration 1100 shows a first example sweeping of two qubit's operating frequencies from their respective idling frequencies towards a common interaction frequency, as described above with reference to FIG. 10. During the first example sweep, qubit q00 is swept past approximately one frequency 1102 representing a defect and qubit q01 is swept past approximately two frequencies 1104 and 1106 representing respective defects.

Illustration 1150 shows a second example sweeping of two qubit's operating frequencies from their respective idling frequencies towards a common interaction frequency, as described above with reference to FIG. 10. During the second example sweep, qubit q00 is swept past approximately three frequencies 1152, 1154 and 1156 representing respective defects. Qubit q01 is swept past a large frequency region 1158 representing respective defects. Since the second example sweeping involves sweeping past more frequencies or frequency regions representing hardware defects, the operating points shown in the first illustration is a better choice compared to the operating points shown in the second illustration.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method for determining frequencies at which to operate interacting qubits arranged as a two dimensional grid in a quantum device, the method comprising:
defining a first cost function that maps qubit operation frequency values to a cost corresponding to an operating state of the quantum device;
applying one or more constraints to the defined first cost function to define an adjusted cost function; and
adjusting qubit operation frequency values to vary the cost according to the adjusted cost function such that computations performed by the quantum device using the adjusted qubit operation frequency values are less error-prone,
wherein adjusting qubit operation frequency values to vary the cost according to the adjusted cost function comprises performing one or more multi-qubit optimization routines to obtain initial qubit operation frequency values, the one or more multi-qubit optimization routines comprising:
performing a grid-scale optimization routine to obtain coarse-grained initial qubit operation frequency values, and
performing a pair-scale optimization routine to adjust the coarse-grained initial qubit operation frequency values to fine-grained initial qubit operation frequency values.

2. The method of claim 1, wherein adjusting qubit operation frequency values to vary the cost according to the adjusted cost function further comprises
performing one or more single qubit optimization routines to adjust the initial qubit operation frequency values to obtain final qubit operation frequency values.

3. The method of claim 1, wherein the one or more multi-qubit optimization routines may be performed in parallel.

4. The method of claim 2, wherein the one or more single qubit optimization routines may be performed in parallel.

5. A method for determining frequencies at which to operate interacting qubits arranged as a two dimensional grid in a quantum device, the method comprising:
defining a first cost function that maps qubit operation frequency values to a cost corresponding to an operating state of the quantum device, wherein the qubit operation frequency values comprise qubit idling frequencies and qubit interaction frequencies;
applying one or more constraints to the defined first cost function to define an adjusted cost function; and
adjusting qubit operation frequency values to vary the cost according to the adjusted cost function such that computations performed by the quantum device using the adjusted qubit operation frequency values are less error-prone,
wherein adjusting qubit operation frequency values to vary the cost according to the adjusted cost function comprises:
performing one or more multi-qubit optimization routines to obtain initial qubit operation frequency values; and
performing one or more single qubit optimization routines to adjust the initial qubit operation frequency values to obtain final qubit operation frequency values.

6. The method of claim 2, further comprising identifying multiple idling frequency arrangements for the grid, the identifying comprising:
defining an idling frequency splitting pattern for the grid; and
bounding a range over which the idling frequency splitting pattern can be slid in frequency without exceeding any qubit's accessible frequency range to determine a corresponding vector of qubit operation frequency values for the qubits in the grid.

7. The method of claim 6, wherein identifying multiple idling frequency arrangements for the grid comprises assuming qubit relaxation time is constant.

8. The method of claim 1, wherein performing a grid-scale optimization routine to obtain coarse-grained initial qubit operation frequency values comprises evaluating the adjusted cost function for each identified idling frequency arrangement for the grid, comprising:

setting the interaction frequency for each pair of qubits to approximately a mean value of idling frequencies of each pair of qubits constituent qubits;

optimizing the adjusted cost function to determine coarse-grained initial qubit idling frequency values; and setting the mean value of the idling frequency for each qubit pair as the coarse-grained initial two-qubit interaction frequency for that pair.

9. The method of claim 8, wherein performing a pair-scale optimization routine to adjust the coarse-grained initial qubit operation frequency values to fine-grained initial qubit operation frequency values comprises:

fixing the coarse-grained initial qubit idling frequency values to the values obtained by the grid-scale optimization routine;

determining fine-grained interaction qubit frequencies by varying the interaction frequency independently for each qubit pair to optimize the cost.

10. The method of claim 9, further comprising bounding the range of interaction frequency values.

11. The method of claim 9, wherein performing a single qubit optimization routine to adjust the initial qubit operation frequency values to obtain final qubit operation frequency values comprises:

determining final qubit idling frequency values by varying idling frequencies for each qubit independently to optimize the cost.

12. The method of claim 11, further comprising bounding the range of idling frequency values.

13. The method of claim 6, further comprising iteratively identifying multiple idling frequency arrangements for the grid until third termination criteria are met.

14. A method for determining frequencies at which to operate interacting qubits arranged as a two dimensional grid in a quantum device, the method comprising:

defining a first cost function that maps qubit operation frequency values to a cost corresponding to an operating state of the quantum device;

applying one or more constraints to the defined first cost function to define an adjusted cost function; and repeatedly adjusting qubit operation frequency values to vary the cost according to the adjusted cost function such that the operating state of the quantum device is improved to account for qubit operation frequency time dependence and computations performed by the quantum device using the adjusted qubit operation frequency values are less error-prone.

15. A method for determining frequencies at which to operate interacting qubits arranged as a two dimensional grid in a quantum device, the method comprising:

defining a first cost function that maps qubit operation frequency values to a cost corresponding to an operating state of the quantum device;

applying one or more constraints to the defined first cost function to define an adjusted cost function, wherein one or more of i) the first or ii) adjusted cost function comprises a weighted sum of cost terms, the cost terms comprising one or more of:

an idling cost term that penalizes i) low qubit relaxation time idling frequencies, ii) low adjacent qubit detuning, or iii) both the low qubit relaxation time idling frequencies and the low adjacent qubit detuning; and an interaction cost term that penalizes i) low qubit relaxation time interaction frequencies ii) low qubit relaxation time frequency regions between qubit idling frequencies for a pair of qubits and a common interaction frequency for said pair of qubits, or iii)

both the low qubit relaxation time interaction frequencies and the low qubit relaxation time frequency regions between qubit idling frequencies for a pair of qubits and a common interaction frequency for said pair of qubits; and adjusting qubit operation frequency values to vary the cost according to the adjusted cost function such that computations performed by the quantum device using the adjusted qubit operation frequency values are less error-prone.

16. A method for determining frequencies at which to operate interacting qubits arranged as a two dimensional grid in a quantum device, the method comprising:

defining a first cost function that maps qubit operation frequency values to a cost corresponding to an operating state of the quantum device;

applying one or more constraints to the defined first cost function to define an adjusted cost function, wherein the one or more constraints incorporate knowledge of one or more of i) the physics or ii) engineering constraints of the quantum computing device; and adjusting qubit operation frequency values to vary the cost according to the adjusted cost function such that computations performed by the quantum device using the adjusted qubit operation frequency values are less error-prone.

17. A method for determining frequencies at which to operate interacting qubits arranged as a two dimensional grid in a quantum device, the method comprising:

defining a first cost function that maps qubit operation frequency values to a cost corresponding to an operating state of the quantum device;

applying one or more constraints to the defined first cost function to define an adjusted cost function, wherein the one or more constrains comprise one or more of predetermined differences in frequency between adjacent qubits, predetermined relationships between different types of operating frequencies, and/or predetermined acceptable frequency error tolerances; and adjusting qubit operation frequency values to vary the cost according to the adjusted cost function such that computations performed by the quantum device using the adjusted qubit operation frequency values are less error-prone.

18. A system comprising one or more classical or quantum computers and one or more storage devices storing instructions that are operable, when executed by the one or more computers, to cause the one or more computers to perform operations for determining frequencies at which to operate interacting qubits arranged as a two dimensional grid in a quantum device, the operations comprising:

defining a first cost function that maps qubit operation frequency values to a cost corresponding to an operating state of the quantum device;

applying one or more constraints to the defined first cost function to define an adjusted cost function; and adjusting qubit operation frequency values to vary the cost according to the adjusted cost function such that the computations performed by the quantum device using the adjusted qubit operation frequency values are less error-prone, wherein adjusting qubit operation frequency values to vary the cost according to the adjusted cost function comprises performing one or more multi-qubit optimization routines to obtain initial qubit operation frequency values, the one or more multi-qubit optimization routines comprising:

performing a grid-scale optimization routine to obtain coarse-grained initial qubit operation frequency values; and performing a pair-scale optimization routine to adjust the coarse-grained initial qubit operation frequency values to fine-grained initial qubit operation frequency values.

19. A computer-readable storage medium comprising instructions stored thereon that are executable by a classical or quantum processing device and upon such execution cause the processing device to perform operations for determining frequencies at which to operate interacting qubits arranged as a two dimensional grid in a quantum device, the operations comprising:

defining a first cost function that maps qubit operation frequency values to a cost corresponding to an operating state of the quantum device;

applying one or more constraints to the defined first cost function to define an adjusted cost function; and adjusting qubit operation frequency values to vary the cost according to the adjusted cost function such that the computations performed by the quantum device using the adjusted qubit operation frequency values are less error-prone, wherein adjusting qubit operation frequency values to vary the cost according to the adjusted cost function comprises performing one or more multi-qubit optimization routines to obtain initial qubit operation frequency values, the one or more multi-qubit optimization routines comprising:

performing a grid-scale optimization routine to obtain coarse-grained initial qubit operation frequency values; and performing a pair-scale optimization routine to adjust the coarse-grained initial qubit operation frequency values to fine-grained initial qubit operation frequency values.

* * * * *